United States Patent [19]

Abrams et al.

[11] Patent Number: 5,530,724
[45] Date of Patent: Jun. 25, 1996

[54] ECHO CANCELER WITH AUTOMATIC ENABLEMENT/DISABLEMENT ON A PER-CALL BASIS

[75] Inventors: Robert J. Abrams, Naperville, Ill.; William J. Atkins, Toms River, N.J.; Victor E. Tomberlin, Lisle, Ill.

[73] Assignee: AT&T Corp., Murray Hill, N.J.

[21] Appl. No.: 346,445

[22] Filed: Nov. 29, 1994

[51] Int. Cl.$^6$ .............................. H04L 1/00; H04M 1/24; H04M 1/00; H04M 9/00

[52] U.S. Cl. .............................. 375/345; 379/3; 379/399; 379/406; 379/407; 379/410; 379/411

[58] Field of Search ............................... 379/3, 399, 406, 379/407, 410, 411; 370/32.1; 375/345

[56] References Cited

U.S. PATENT DOCUMENTS

| | | | |
|---|---|---|---|
| 4,982,428 | 1/1991 | Agazzi | 379/410 |
| 5,117,418 | 5/1992 | Chaffee | 379/406 |
| 5,131,032 | 7/1992 | Esaki | 379/406 |
| 5,148,427 | 9/1992 | Buttle | 379/411 |
| 5,163,044 | 11/1992 | Golden | 379/410 |

OTHER PUBLICATIONS

"Echo Control in Today's Digital Networks", Steve Jolley, *Coherent* Feature Article, pp. 1, 7–10.

Iss. 2, AT&T 332–415–130, "Functional Description", pp. 2, 2–5, 2–6, 2–10 and 2–11, 1990 AT&T.

"255 T1 Echo Canceller Modules", *Tellabs Technical Manual*, 1992, pp. 1, 11–15.

"Coherent Eases Lane Restrictions on the Information Superhighway", *Coherent* News Release, Mar. 2, 1994, two descriptive text pages, two advertising pages "Automatic Echo Cancellation for ISDN without dedicated PRI Channels".

"Echo is Nagging Problem in Primary Rate Private Network", Kevin Tanzillo, *Communication News*, Oct., 1992, p. 49.

*Primary Examiner*—Stephen Chin
*Assistant Examiner*—Vijay Shankar
*Attorney, Agent, or Firm*—Charles L. Warren

[57] ABSTRACT

Echo cancellation can be enabled to cancel echoes on an outbound transmission path based on original signals on an inbound transmission path. A controller of echo canceler enablement monitors digitized control information contained in call origination messages associated with the establishment of communications. A determination of the type of digitized information to be carried by a two-way communication channel is made. The controller causes the echo canceler to be enabled or disabled on a per-call basis based on the type of digitized information. A stand-alone echo canceler provides automatic enablement/disablement on a per-call basis based on the type of digitized information to be carried on a communication channel as determined by monitoring associated control messages.

15 Claims, 6 Drawing Sheets

ECHO CANCELER WITH AUTOMATIC ENABLEMENT/DISABLEMENT ON A PER-CALL BASIS

BACKGROUND OF THE INVENTION

The present invention is directed to echo cancelers which provide echo cancellation on communication channels carrying digitized signals. The invention is more specifically directed to a stand-alone echo canceler capable of automatically enabling or disabling echo cancellation on a per-call basis.

In telecommunication systems it is common to utilize separate transmit and receive transmission channels to carry communications between subscribers. An interface between the separated transmit and receive channels and a two-way communication channel coupled to normal subscribers is typically accomplished by a 4-wire to 2-wire hybrid. Impedance mismatches terminating the transmission lines at the hybrid result in incomplete cancellation of an incoming signal, e.g. the other party's speech, causing an attenuated replica of the incoming signal, an echo, to be carried on the outbound channel. If the echo is not attenuated, it may provide an annoying signal to the subscriber which originated the speech. Echo cancelers typically located near the 4-wire to 2-wire conversion location process the inbound communication signals and generate an echo cancellation signal which is 180 degrees out of phase with the echo signal. The echo cancellation signal is added to the outbound channel in time synchronization so as to effectively cancel the echo signal. Echo cancelers are available to process both analog and digitally encoded signals carried on the 4-wire transmission channels.

It is normally desirable to provide echo cancellation where conventional voice signals are being transmitted in order to eliminate or minimize an undesired return echo. However, there are circumstances in which the utilization of an echo canceler for a given call is undesired. For example, a modem which uses tone signaling to convey information operating in a full duplex mode may be impaired by the echo canceling signal injected on the return path. Other types of digital data transmission, especially when operating in a full duplex transmission mode, may also be adversely impaired by the introduction of a signal produced by an echo canceler intended to cancel the return echo. Therefore, it is desirable to be able to control whether or not an echo canceler is utilized.

Various types of techniques have been developed for controlling echo cancelers. Typically, modems operating in accordance with CCITT/ITU-T standards may transmit a predetermined tone prior to the initiation of communications on a channel as a signal to disable echo canceling for the call. Proprietary control signals generated by central office switches are sometimes transmitted to associated echo cancelers in order to provide control of the echo canceler. Such proprietary systems may require communication paths separate from the traffic carrying channel between the equipment generating the control signals and the echo cancelers in order to communicate the control information to the echo canceter. Thus, a central office or toll switch can control whether an associated echo canceler will be active or inactive. Such echo canceling techniques have generally proved successful for many applications.

However, such echo canceler use has proved unsatisfactory due to unreliability, lack of stability, or improper function under some data transmission requirements. For example, a private ISDN network may require echo cancellation on voice calls while also requiring that echo cancellation be disabled on calls in which data is being transmitted. One solution is to separate and identify the channels which carry voice and data calls. Echo cancelers can be placed only on the channels which carry the voice calls. While this technique provides a solution, it limits the users of the network to fixed choices between voice and data channels. Another possible solution is to use control signals for echo canceler control generated by a private branch exchange (PBX) or switching equipment in the network coupled to the PBX. However, such control signals may be incompatible since different proprietary control signals may be encountered. Where separate channels are needed to transmit the control signals to an echo canceler, separate channels may not be available or may be available only at substantial cost. Thus, a need exists for an improved echo cancellation technique which accommodates voice or data calls to be made on the same communication channel.

SUMMARY OF THE INVENTION

It is an object of the present invention to provide an echo canceler capable of automatically enabling or disabling itself on a per-call basis. A further objective is to provide an echo cancellation technique which does not require additional actions or control signals by other network elements in order to accomplish the control of the echo canceler.

In accordance with an embodiment of the present invention, a network exists in which two-way communication channels carry digitized signals on outbound and inbound transmission channels. The echo canceler provides echo cancellation for echoes on the outbound transmission path based on the original signals on the inbound communication path. The echo canceler includes a monitor which monitors digitized control information contained in call origination messages associated with the establishment of communications on the transmission channels. Associated with the monitor is a determination circuit which determines the type of digitized information to be carried by the two-way communication channels. An automatic controller, which is responsive to the type of information previously determined to be carried, causes the echo canceler to be enabled or disabled on a per-call basis based on the type of digitized information as determined during call establishment. Thus, a stand-alone echo canceler provides automatic enablement/disablement on a per-call basis based on the type of information to be carried on a communication channel.

In an exemplary embodiment of the present invention, signaling associated with call setup such as in accordance with CCITT Q.931 recommendations are preferably monitored by the echo canceler in order to make a determination of the type of call to be carried. This, of course, requires the echo canceler to monitor the control messages corresponding to calls which may be set up on channels served by the echo canceler. This technique permits a self determination of whether the echo canceler should be active or inactive on a per-call basis based on the type of traffic to be carried by the call as determined by the control messages which are transmitted during call setup.

DETAILED DESCRIPTION

Figure 1:
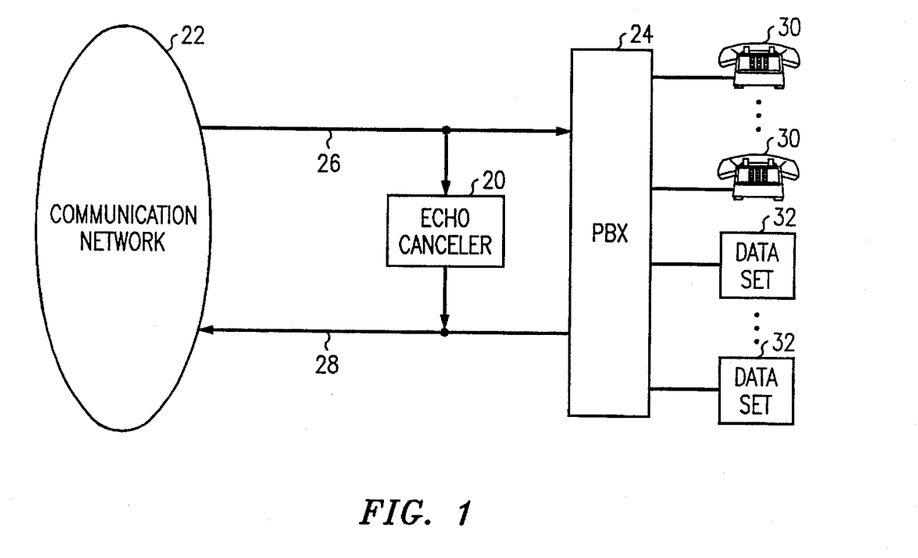
FIG. 1 illustrates a communication system which incorporates an echo canceler in accordance with the present invention.

FIG. 1 illustrates a telecommunication system which incorporates an exemplary echo canceler 20 in accordance with the present invention. A communication network 22 is coupled to a private branch exchange (PBX) 24 by inbound and outbound transmission channels 26 and 28, respectively. In the illustrative example, transmission channels 26 and 28 carry integrated services digital network (ISDN), primary rate interface (PRI), transmission formats such as utilized in a private ISDN network. Transmission channel 26 carries inbound information, i.e. information from network 22 to PBX 24; transmission channel 28 provides outbound information from PBX 24 to network 22. These two one-way transmission channels support a plurality of concurrent telephone calls. As will be explained in greater detail below, a voice signal carried on transmission channel 26 may produce an echo signal resulting on transmission channel 28. This echo signal is minimized by echo canceler 20 to prevent the originator of the voice signal on transmission channel 26 from hearing an undesired echo of his prior speech carried by a voice channel (time slot) on transmission channel 28.

The PBX 24 supports a plurality of telephone sets 30 and data sets 32. The telephone sets may comprise digital telephones or conventional analog telephones. The data sets 32 may include devices capable of direct digital transmission or may include other devices such as a personal computer which communicates utilizing a conventional analog modem. Thus, it will be apparent that the telephone calls carried on channels 26 and 28 may comprise a mixed variety of types of communications depending upon the traffic patterns of the subscribers. The echo canceler 20, in accordance with the present invention, permits echo cancellation to be automatically enabled and disabled on a per-call basis in order provide desired echo cancellation such as on a conventional voice call and to provide no echo cancellation such as on a data call.

Figure 2:
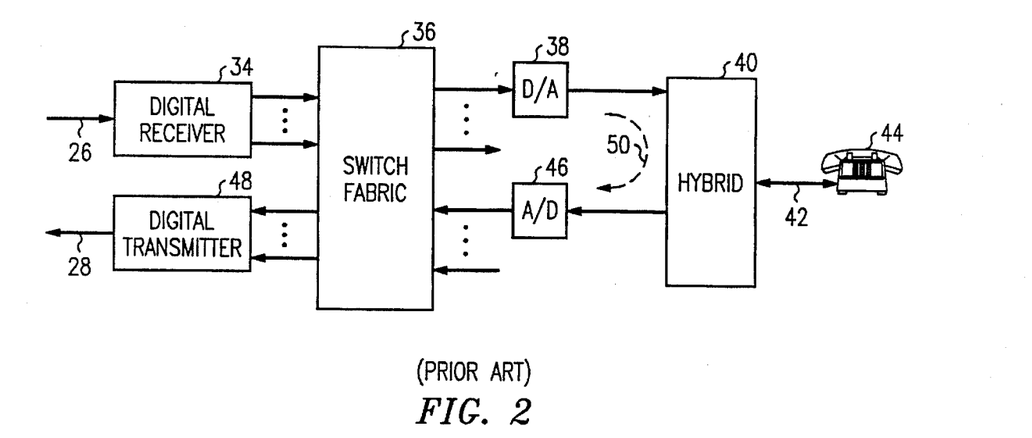
FIG. 2 is a block diagram which represents a PBX known in the prior art for terminating inbound and outbound digital channels and for providing service to a subscriber.

FIG. 2 illustrates a block diagram of PBX 24 as exists in the prior art. A digital receiver 34 provides an interface for receiving ISDN digital transmissions on transmission channel 26 and translates the incoming time slots (channels) into separate lines coupled to a switch fabric 36. Digital-to-analog (D/A) converters 38 are coupled to output lines from switch fabric 36 and convert the digital information to analog form for presentation to a 4-wire to 2-wire hybrid 40. The hybrid provides a two-way communication channel 42 to a conventional telephone instrument 44. Voice signals originating at telephone set 44 are transmitted through hybrid 40 and converted by analog-to-digital (A/D) 46 which provides the converted digital signals to switch fabric 36. The switch fabric provides the appropriate switching function, selects an output line that corresponds to a time slot, and provides the information to digital transmitter 48 which transmits a plurality of telephone conversations in digitized form on transmission channel 28.

An echo signal flowing via the illustrated path 50 provides an unwanted replica of the signal transmitted through D/A 38 onto the outbound transmission line associated with A/D 46. Thus, the echo signal component will be coupled through the fabric and digital transmitter 48 onto transmission channel 28 in the appropriate time slot on which desired voice communications originating at telephone set 44 are carried. The echo signal is due to the non perfect termination matches of the communication lines associated with D/A 38, A/D 46, and line 42 which supports telephone set 44. The non perfect line terminations permit a portion of the signal being transmitted to telephone set 44 to be undesirably coupled to A/D 46. The magnitude of the undesired echo signal is related to the degree of mismatch associated with hybrid 40 and the associated transmission lines. It is the function of an echo canceler located on the 4-wire side of the hybrid to minimize, if not substantially eliminate, the undesired echo during a conventional voice conversation.

Figure 3:
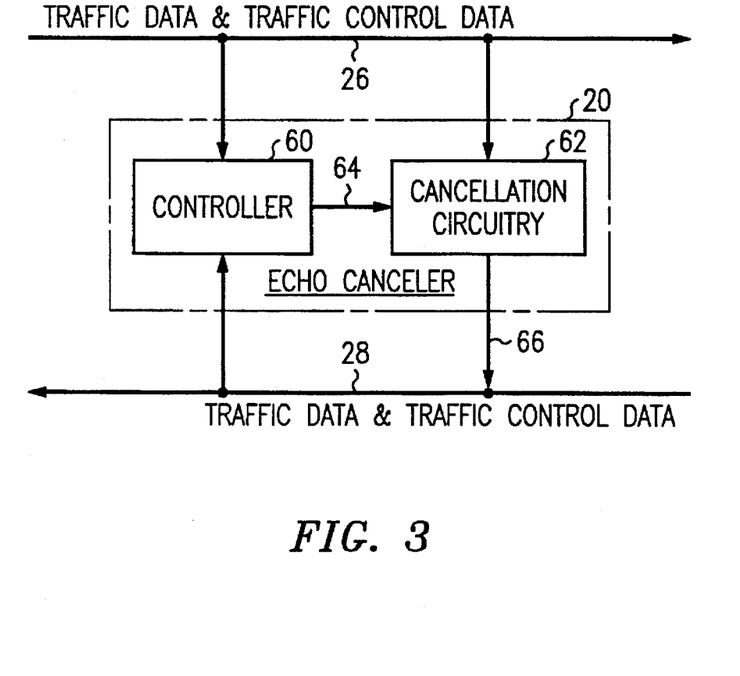
FIG. 3 illustrates an exemplary embodiment of an echo canceler in accordance with the present invention.

FIG. 3 illustrates a block diagram of an embodiment of an echo canceler 20 in accordance with the present invention. The echo canceler includes a controller 60 and cancellation circuitry 62, both of which are coupled to transmission channel 26. The cancellation circuitry 62 provides the conventional generation of an echo cancellation signal. Typically an original signal from transmission channel 26 is converted to be 180 degrees out of phase with the echo signal on transmission channel 28 and its magnitude adjusted to achieve cancellation of the echo signal upon adding the echo cancellation signal to the echo signal on transmission channel 28. It will also be known to those skilled in the art that the echo cancellation signal must be correlated in time such that it is added at the appropriate time to effect the desired cancellation. Controller 60 generates control signals which are coupled to the cancellation circuitry 62 by communication paths 64. The control signals determine whether the cancellation circuitry will be active or inactive for a particular call which correlates to one of the communication channels carried on transmission channel 26.

In the exemplary embodiment in accordance with the present invention, descriptive information concerning the type of information to be transmitted over each of the communication channels carried by transmission channel 26 is contained in a separate communication channel known as the "D channel". The controller 60 monitors the control information relating to the calls/channels being carried on path 26 and interprets (decodes) the type of information to be carried on each channel. A decision as to whether a corresponding echo canceler should be enabled or not depends upon the type of information to be carried. This monitoring of the control information is carried out automatically by controller 60 without assistance from any other equipment in the communication network. The decision of whether or not echo cancellation is to be provided on each call is made without other signals or special control information transmitted to the echo canceler. A more detailed explanation of the operation of controller 60 is provided below.

Figure 4:
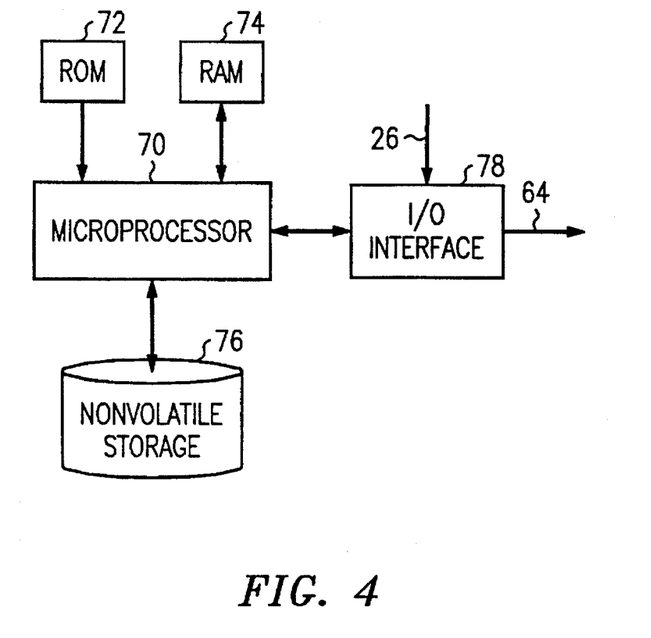
FIG. 4 illustrates an exemplary embodiment of a controller as shown in FIG. 3.

FIG. 4 illustrates a block diagram of an exemplary embodiment of controller 60 as shown in FIG. 3. A microprocessor 70 is supported by read-only memory (ROM) 72, random access memory (RAM) 74 and a nonvolatile storage device 76 which may consist of nonvolatile solid state memory or a hard disk drive or other suitable device. An input/output (I/O) interface device 78 is coupled to microprocessor 70, and supports the reception of signals received from transmission channel 26 and the transmission of control signals carried on path 64 to cancellation circuitry 62. It will also be apparent to those skilled in the art that various types of input/output interfaces are available for interfacing to the transmission of high speed digital information such as may be received from transmission channel 26. Although the illustrative embodiment illustrates a microprocessor based system in which a software control program is utilized to provide the desired functionality, various equivalents can be utilized to achieve the same functionality. For example, discrete or integrated circuit logic can be combined to provide the desired function where specified types of control information from transmission channel 26 are predetermined. It will also be apparent that other types of implementations including various configurations of state machines and other hardware or hardware in combination with software driven architectures can be utilized. The controller receives and interprets call setup messages carried on transmission channel 26 to enable decisions to be made which control the enablement or disablement of cancellation circuitry associated with each call carried on the channels 26 and 28. A description of the operation of the exemplary embodiment is provided below.

Figure 5:
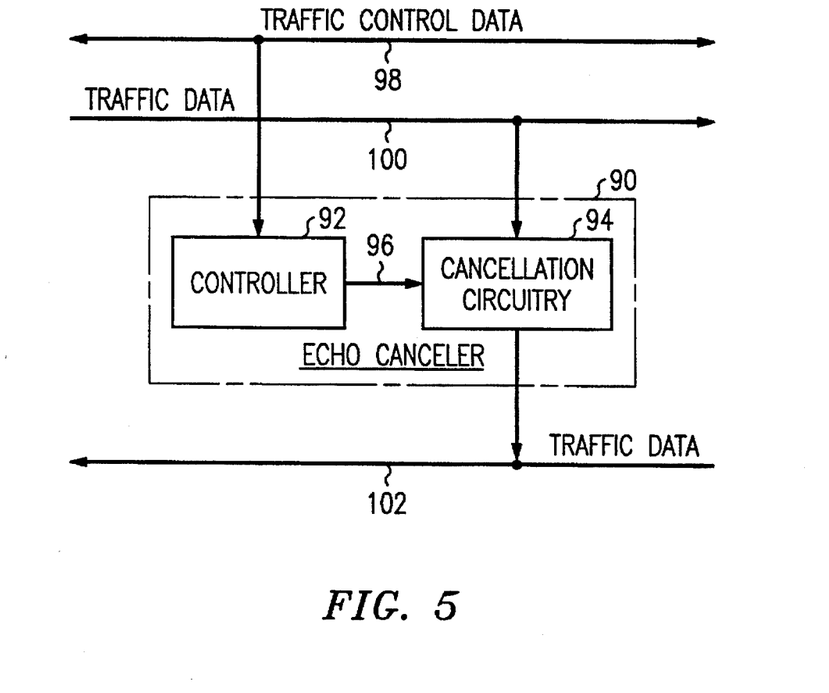
FIG. 5 illustrates an alternative embodiment of an echo canceler in accordance with the present invention.

FIG. 5 shows an alternative embodiment in accordance with the present invention in which echo canceler 90 includes a controller 92 and cancellation circuitry 94 which is controlled by control signals transmitted by controller 92 on paths 96. The general operation of echo canceler 90 is substantially identical to that of echo canceler 20 shown in FIG. 3 except that controller 92 receives and monitors traffic control data carried on a separate channel 98 which controls the traffic being carried on separate traffic data channels 100 and 102. In the illustrative example, traffic data is carried in one direction on channel 100 and traffic data is carried in the opposite direction by channel 102. Channel 98 contains messages that control the original call setup and call maintenance activities associated with the traffic carried by the channels 100 and 102. The independent data channel 98 simplifies the implementation of controller 92 in that only the control messages are presented to the controller 92 in this illustrative embodiment. This differs from the prior embodiment shown in FIG. 3 in which the controller 60 received both control messages and traffic information requiring the controller 60 to identify and act on the control information. In both the embodiments shown in FIGS. 3 and 5, the controllers identify a particular call/communication channel and transmit a control signal which is interpreted by the cancellation circuitry to enable or disable echo cancellation for the corresponding call/channel. Of course, channel 98 could carry traffic data as well as control data which would require the controller 92 to be able to distinguish the control data from the traffic data. The embodiment in FIG. 5 also contemplates-that traffic control data could be sent on channel 98 from a facility (equipment) that is other than the facility from which the traffic data originates, i.e. a non-facility associated signaling situation.

Figure 6:
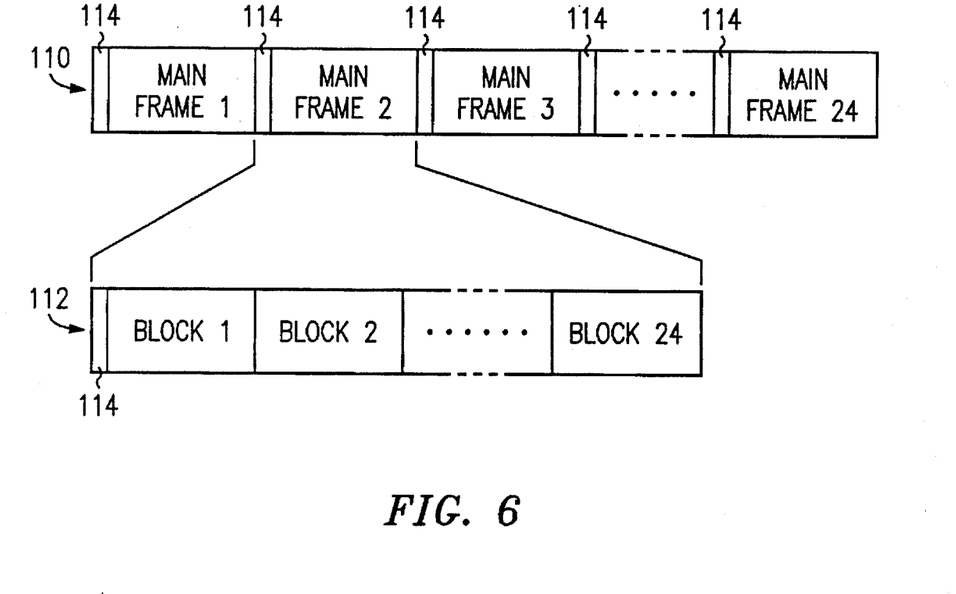
FIG. 6 illustrates communication formats utilized in accordance with an exemplary embodiment of the present invention.

FIG. 6 illustrates a signaling protocol or format 110 for an extended super frame structure and a corresponding format 112 illustrating each main frame structure. In accordance with this illustrative example, FIG. 6 depicts formats associated with ISDN communications in which the extended super frame 110 is transmitted every 3 milliseconds and wherein each main frame occupies 125 microseconds. Each time slot or block in structure 112 corresponds to a separate communication channel. Each block in structure 112 carries 8 bits of information which combined with a single header bit 114 results in 193 bits transmitted every 125 microseconds, which in turn yields a transmission data rate of 1.544 Mb/s. In the ISDN environment, block 24 in each of structures 112 is typically defined as the D channel, i.e. a channel that carries control information relating to the initial establishment of calls, information concerning the calls, and information concerning the tear down or release of previously established calls. Since block 24 contains 8 bits of information which is transmitted every 125 microseconds, this translates into a data rate of 64 Kb/s.

Figure 7:
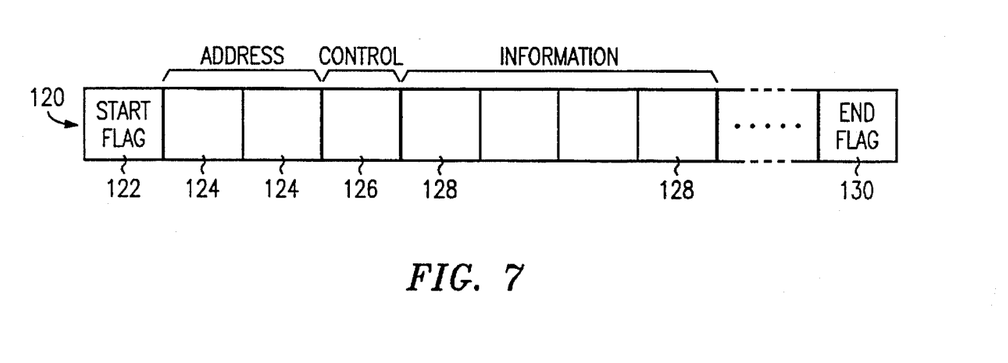
FIG. 7 illustrates an exemplary format in which call setup and clearing messages are transmitted.

FIG. 7 illustrates a data format 120 in which each block represents information collected from a D channel (block 24.) The D channels from a series of main frames are extracted and combined in order to provide control information. This technique is generally defined in accordance with CCITT/ITU-T recommendation Q.921. The structure 120 includes a start flag 122, address blocks 124, control data 126, other information blocks 128 and an end flag 130. Of primary interest in accordance with the present invention, are the information blocks 128 which contain messages further described in FIGS. 8, 9, and 10. It will be apparent to those skilled in the art that a plurality of successive D channel blocks 24 contained in consecutive data structures 112 must be assembled in order to form the structure 120 as shown in FIG. 7.

Figure 8:
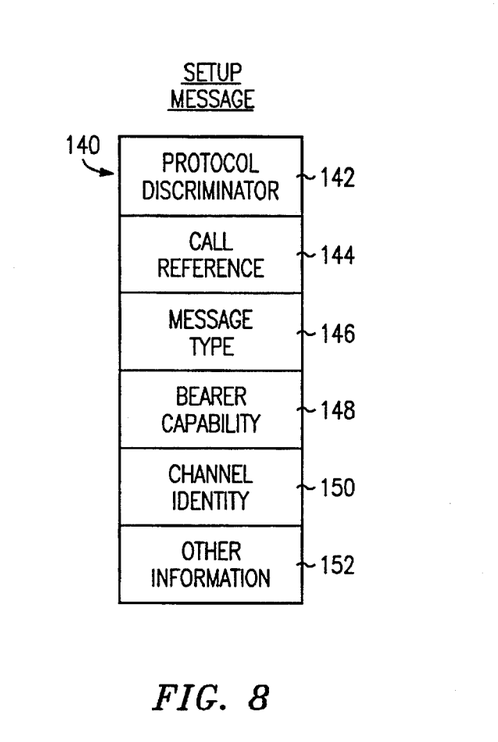
FIG. 8 illustrates an exemplary format for an initial call setup message which may be transmitted in a system in accordance with the present invention.

FIG. 8 illustrates an exemplary set of data fields contained in information blocks 128 which constitute a setup message 140 for a communication channel. The setup message includes a plurality of data segments (fields) including a protocol discriminator segment 142 which identifies the type of protocol, such as Q.931, being utilized. A call reference segment 140 contains information identifying the call as a unique call among the other calls which may be concurrently carried. A message type segment 146 provides information that identifies this message as an initial setup request for a communication channel. The bearer capability segment 148 contains a plurality of data fields. The most important of this information for purposes of the present invention includes identification of whether the communication will consist of speech or data, conventional analog audio signals in the 3.1 kilohertz band, restricted digital information or unrestricted data information which may require a full 64 Kb/s width for transmission. It will be noted by those skilled in the art that for the unrestricted data transmission requiring 64 Kb/s data, a full block as shown in structure 112 is required to carry this information, thereby leaving no additional information which can be contained in each block as header or control information. The information contained in the bearer capability segment 148 is utilized as will be described below, to make decisions concerning whether the echo cancellation should be enabled or disabled. A channel identification segment 150 identifies the channel or channels to be associated with the communication. Other informational segments 152 contain other information related to the call setup.

Figure 9:
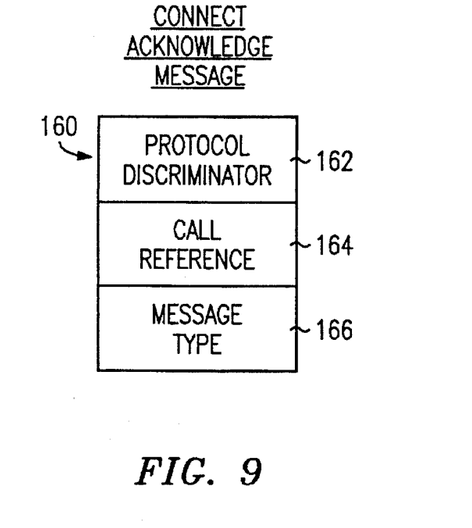
FIG. 9 illustrates an exemplary format for a connect acknowledge message which may be transmitted in a system in accordance with the present invention.

FIG. 9 illustrates a data structure that defines a connect acknowledgment message 160 which would be transmitted on D channel in response to a previously requested setup message. This message generally indicates that a call has been established on the a requested communication channel in response to a previous setup message request. The connect acknowledge message 160 includes a protocol discriminator 162 indicating the protocol to be followed. The call reference segment 164, similar to call reference segment 144, identifies the particular call to be identified in accordance with the message. The message type 166 indicates that the message is a connect acknowledge message.

Figure 10:
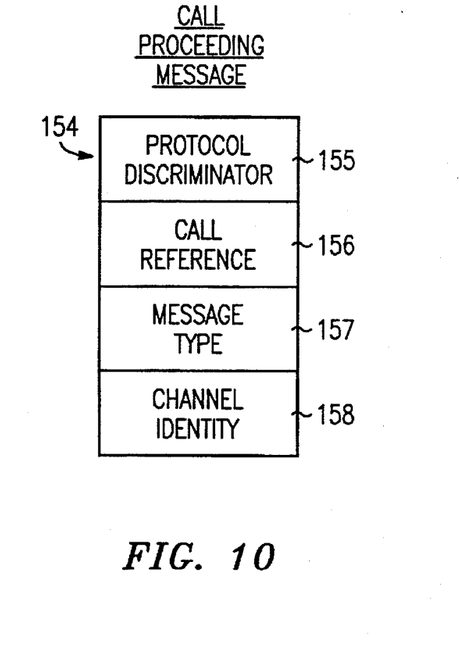
FIG. 10 illustrates an exemplary format for a call proceeding message which may be transmitted in a system in accordance with the present invention.

FIG. 10 illustrates a data structure that defines a call proceeding message 154 which would be transmitted on D channel in response to a previously requested setup message. This message generally indicates that a requested communication channel is authorized in response to a previous setup message request. Under some circumstances the call proceeding message returns a different channel than the originally requested one, in which case the returned channel supersedes the requested channel; this is known as channel negotiation. The call proceeding message 154 includes a protocol discriminator 155 indicating the protocol to be followed. The call reference segment 156, similar to call reference segment 144, identifies the particular call to be identified in accordance with the message. The message type 157 indicates that the message is a call proceeding message. A channel identification segment 158 identifies the channel or channels to be associated with the communication.

Figure 11:
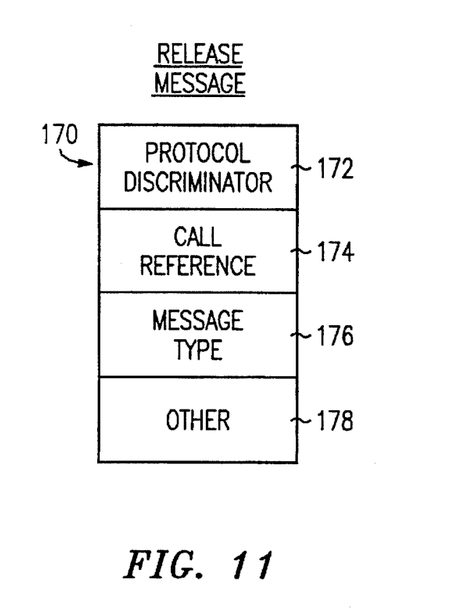
FIG. 11 illustrates an exemplary format of a release message which may be transmitted in a system in accordance with the present invention.

FIG. 11 illustrates a release message format 170 which would be contained within information blocks 128 as an indicator that a previously existing communication channel is to be released, i.e. terminated. Protocol discriminator segment 172 identifies the protocol being utilized. The call reference segment 174 identifies the particular call to which the release message relates. The message type segment 176 indicates that this message is a release message requesting a release or tear down of a previously existing call. The other segment 178 may contain additional information relating to the cause or nature of the release request. Other messages, such as release complete and disconnect messages (not shown), are also utilized to accomplish "release" of the call.

Figure 12:
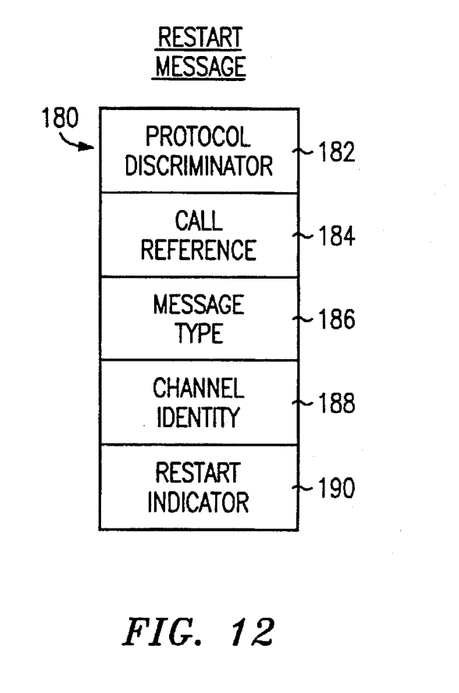
FIG. 12 illustrates an exemplary format for a restart message which may be transmitted in a system in accordance with the present invention.

FIG. 12 illustrates a data structure that defines a restart message 180 which would be transmitted on D channel. This message generally indicates that a specified communication channel, a group of channels, or even all associated channels are to be released or torn down. The restart message 180 includes a protocol discriminator 182 indicating the protocol to be followed. The call reference segment 184 identifies the particular call or calls to be identified in accordance with the message. The message type 186 indicates that the message is a restart message. A channel identification segment 188 identifies the channel or channels to be associated with the communication. The restart indicator 190 contains information that identifies whether a single channel, a group of channels, or all associated channels are to be restarted which causes active calls to be cleared.

Figure 13:
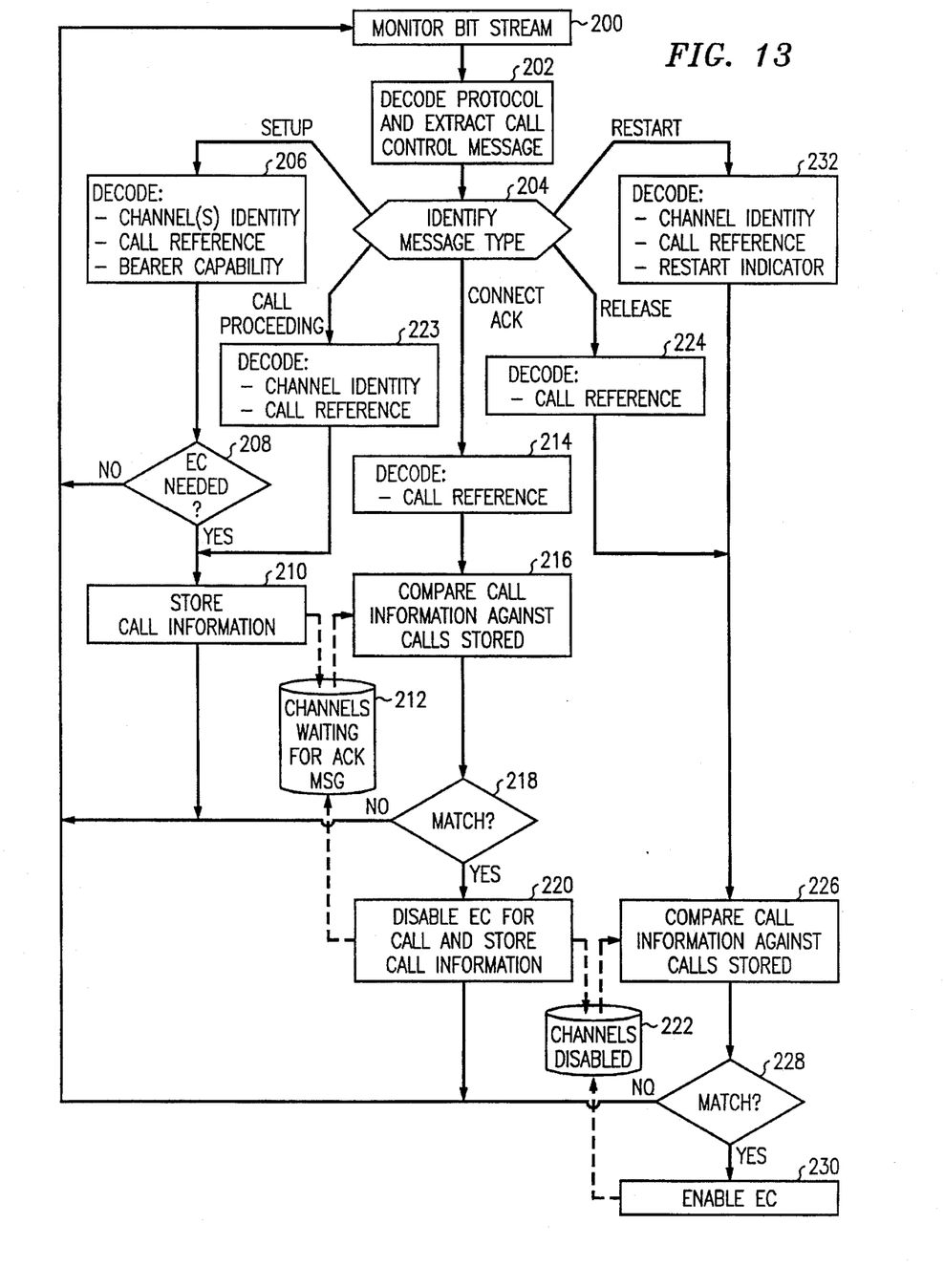
FIG. 13 illustrates a flow diagram of an exemplary method in accordance with the present invention in which an echo canceler provides automatic enablement/disablement of its function on a call-by-call basis in accordance with the present invention.

FIG. 13 is a flow diagram illustrating an exemplary method in accordance with the present invention wherein an echo canceler automatically makes an independent determination of echo cancellation on a call-by-call (channel-by-channel) basis. This method may be practiced by the exemplary embodiments of the echo canceler.

In step 200 the bit stream, which at least carries control messages relating to calls carried on a communication path, is monitored. In accordance with step 202 the protocol is decoded to confirm the information is in a known predetermined format and the call control messages contained in blocks 128 are extracted for further processing. In step 204 an extracted call control message is identified as one of five exemplary message types: setup message; connect acknowledgment message; call proceeding message; release message; restart message. Depending upon the identification of the message type, the method proceeds as indicated in one of five branches.

In a first example, assume that the message type is identified as a setup message causing the method to branch to step 206 in which the channels identification, call reference, and bearer capability are decoded (see FIG. 8). Next, a decision is made as to whether echo cancellation is needed at step 208. As explained with regard to FIG. 8, fields contained in the bearer capability segment 148 provide information defining the type of data and data rates which will be carried. In step 208 these fields are evaluated and a determination made of whether echo canceling should be enabled depending on the data transmission characteristics contained in the fields. For example, a decision (truth) table can be implemented to determine when echo cancellation is to be enabled/disabled. The following exemplary table illustrates such decisions based on information contained in the bearer capability data 148.

| Decision Table | | |
| --- | --- | --- |
| Field in Bearer Capability Information Element | Value | Echo Cancellation |
| information transfer capability | speech | enabled |
| information transfer capability; protocol id. | 3.1 KHz audio; G.711 Mu-law speech | enabled |
| information transfer capability; protocol id. | 3.1 KHz audio; CCITT rate adaptation V.110/X.30 | disabled |
| information transfer capability | unrestricted digital information | disabled |
| information transfer capability | restricted digital information | disabled |
| transfer mode | packet mode | disabled |

A NO determination in step 208 causes a return to monitoring other information in step 200. A YES determination in step 208 causes step 210 to store call information relating to the setup message, such as call and channel identification information in a memory element 212. The exemplary technique stores this information and does not take immediate action concerning echo canceler enablement/disablement until the communication channel has been authorized. It is believed to be preferable to await such confirmation in order to prevent premature enablement or disablement of an echo canceler when the setup message request is not acknowledged or accepted. However, it will be apparent to those skilled in the art that the present invention contemplates that echo canceler enablement or disablement could be initiated without waiting for receipt of a connect acknowledgment message. Following step 210 the processing returns to step 200.

In a further example, assume that the message type has been identified in step 204 as a call proceeding message. Processing branches to step 223, wherein the channel identification and call reference are decoded. Processing proceeds to step 210 in which information corresponding to the call reference in data storage element 212 is updated with the channel identification that was decoded from the call proceeding message in step 223.

In a further example, assume that the message type has been identified in step 204 to be a connect acknowledgment message. Processing proceeds to decode step 214 in which the call reference information are decoded. Then, step 216 compares the call information extracted in step 214 against calls stored in memory element 212 to determine if the connect acknowledgment message corresponds to a communication channel requested by prior call setup message. A determination step 218 determines whether the connect acknowledgment message corresponds to such a previous call setup message request. A NO determination results in return to step 200. A YES determination by step 218 leads to a determination in step 220 to disable (turn OFF) the echo canceler for the corresponding call/channel and to store the channel information in a memory storage element 222 wherein calls that have echo cancellation disabled are stored. Also, the corresponding information in storage element 212 is updated to remove the subject channel as waiting for an acknowledge message. This ends processing of the connect acknowledge message and a return to step 200.

When the message type identification made by step 204 identifies a release message, step 224 decodes the call reference information. Then, step 226 makes a comparison of the call information extracted in step 224 against call information stored in memory element 222 to determine whether or not a match exists. That is, a determination is made of whether a call to be released corresponds to a call in which an associated echo canceler had been disabled. Step 228 makes a determination of whether such a match exists. A NO determination results in a return to step 200 and corresponds to a determination that for the communication channel being released in accordance with the release message; no corresponding communication channel had been stored in memory element 222 and hence, the echo canceler had not been previously disabled for this call. A YES determination by step 228 results in a control signal being generated and sent to the corresponding echo canceler to enable (turn ON) the echo canceler in step 230, and the channel information in storage element 222 is updated to indicate that the corresponding channel is no longer disabled. It will be apparent to those skilled in the art that other control messages which may be utilized in a particular implementation may need to be monitored and appropriate action relating to the echo canceler taken upon detection of such messages.

When the message type identification made by step 204 identifies a restart message, step 232 decodes the channel identification, the call reference and the restart indicator. In step 226 the information from the restart message is utilized to identify which channels are to be re-enabled. If there are matching channels in data storage element 222 as determined in step 228, echo cancellation is re-enabled in step 230 and data storage element 228 is updated.

The exemplary control method illustrated in FIG. 13 operates on a default condition of the echo canceler being enabled for each call. Thus, the determinations are made to determine if the echo canceler is to be disabled, and if disabled, a message, such as a release message, corresponding to the call or channel causes the corresponding echo canceler to be enabled thereby, returning to the default condition. The illustrated method has equivalents and alternatives including reversing the default condition, that is, echo cancelers initially disabled and utilizing a similar process to enable an echo canceler when echo cancellation is needed, and upon the release, a return to the default state in which the echo canceler is disabled. It will also be apparent to those skilled in the art that a similar technique using no default state may be utilized. That is, a positive determination is made on each call setup (setup message and connect acknowledge message) as to whether the call requires or does not require echo cancellation. In such a system the utilization of the release message may be utilized to return the echo canceler to an opposite state or the release messages may simply be ignored since each message is determined upon its own requirements without a default condition.

The illustrated method in accordance with FIG. 13 does not generate a control echo canceler signal until a connect acknowledge message corresponding to a previous call setup message has been identified (see step 220). It is believed that this technique minimizes the generation of control signals and the possible altering of echo canceler circuitry states in cases in which requested call setups are not authorized, that is, a connect acknowledgment message does not authorize the setting up of the call. However, it will be apparent that this is a design parameter choice and that in a given system configuration, echo canceler determinations could be made upon call setup message determinations without requiring or utilizing a connect acknowledge message as the required trigger. In such an application a determination made in step 208 could cause the immediate disablement of the echo canceler, effectively branching to step 220 thereby, causing direct echo canceler action based on only the setup message condition.

It will be understood by those skilled in the art that the exemplary apparatus and method as described are suitable for a variety of environments in which digitally encoded signals are carried on communication channels in which echo cancellation may be required. This is especially important in environments in which subscribers may utilize the same communication channels to send both speech information which requires echo cancellation and other data information in which echo cancellation could adversely impact the transmission of data. Various types of communication protocols could benefit from such echo canceler control including systems, such as narrow-band, wide-band, and broad-band ISDN systems, utilizing underlying technologies such as asynchronous transfer mode (ATM) to carry digitized data as well as other forms of digital transfer protocols.

Although the embodiments of present invention have been described and illustrated in the drawings, the scope of the invention is defined by the claims which follow.

We claim:

1. An echo canceler that provides echo cancellation for two-way communication channels that carry digitized signals on first and second transmission channels, echo signals on the second transmission channel, digital signals carried on the first transmission channel, the echo canceler comprising:

means for minimizing the magnitude of the echo signals on the second transmission channel;

means for monitoring digitized control information associated with the establishment of communications over the two-way communication channels;

means coupled to the monitoring means for determining a type of digitized information to be carried by the two-way communication channels;

means, responsive to said determining means and coupled to said minimizing means, for automatically controlling whether said minimizing means minimizes echo signals on the two-way communication channels based on the type of digitized information determined to be carried on the respective two-way communication channels, whereby echo cancellation for each communication channel is automatically controlled based on the type of digitized information to be carried by each communication channel.

2. The echo canceler according to claim 1 wherein said monitoring means monitors first control messages associated with the establishment of communications on said two-way communication channels, said first control messages containing a first data field which identifies the type of digitized information to be carried, said monitoring means reading said first data field and said determining means making a type determination based on the first data field.

3. The echo canceler according to claim 1 wherein said controlling means comprises means for generating control signals based on the type of digitized information determined to be carried on said two-way communication channels and transmitting said control signals to the minimizing means, said minimizing means comprising means responsive to the control signals for enabling and disabling the cancellation of echo signals based on the control signals.

4. In an echo canceler that provides echo cancellation for two-way communication channels that carry digitized signals on first and second transmission channels, echo signals on the second transmission channel being an undesired replica of digital signals carried on the first transmission channel, a method comprising the steps of:

monitoring digitized control information associated with the establishment of communications over the two-way communication channels;

determining, based on the control information monitored, a type of digitized information to be carried on the two-way communication channels;

automatically controlling whether minimization of the echo signals will be enabled on each of the two-way communication channels based on the type of digitized information ascertained by the determining step.

5. The method according to claim 4 wherein said monitoring step monitors first control messages associated with the establishment of communications on said two-way communication channels, said first control messages containing a first data field which identifies the type of digitized information to be carried, said monitoring step reading said first data field and said determining step making a type determination based on the first data field.

6. The method according to claim 4 wherein said controlling step comprises the steps of generating control signals based on the type of digitized information determined to be carried on said two-way communication channels, said minimizing step selectably minimizing cancellation of echo signals based on the control signals.

7. An echo canceler that provides echo cancellation for two-way communication channels that carry digitized signals on first and second transmission channels, echo signals on the second transmission channel being an undesired replica of digital signals carried on the first transmission channel, the echo canceler comprising:

canceling circuit that selectably minimizes the magnitude of the echo signals on the second channel;

controller coupled to the canceling circuit, the controller comprising:

monitor that monitors digitized control information associated with the establishment of communications over the two-way communication channels;

decoder coupled to the monitor for determining a type of digitized information to be carried on the two-way communication channels;

the controller, responsive to said decoder, automatically controlling whether said canceling circuit minimizes echo signals on each of the two-way communication channels based on the type of digitized information determined to be carried on the respective two-way communication channels, whereby echo cancellation is automatically controlled based on the type of digitized information to be carried by each channel.

8. The echo canceler according to claim 7 wherein said monitor monitors first control messages associated with the establishment of communications on said two-way communication channels, said first control messages containing a first data field which identifies the type of digitized information to be carried, said decoder reading said first data field and determining a type determination based on the first data field.

9. The echo canceler according to claim 7 wherein said controller generates control signals based on the type of digitized information determined to be carried on said two-way communication channels and transmits said control signals to the canceling circuit which responds to the control signals by selecting whether or not to minimize cancellation of echo signals on a per channel basis based on the control signals.

10. The echo canceler according to claim 2 wherein the digitized signals are carried in packets, the monitoring means monitoring the first control messages which are also carried in packets.

11. The echo canceler according to claim 1 wherein said monitoring means comprises means for sensing an initial request message for the establishment of a communication channel, and means for sensing an acknowledgment message in response to the initial request message, the acknowledgment message indicating whether a communication channel will be allocated in response to the initial request message;

said controlling means automatically controlling whether said minimizing means minimizes echo signals on a two-way communication channel based on the type of digitized information determined to be carried and, based on whether a corresponding acknowledgment message has indicated that a corresponding communication channel will be allocated.

12. The method according to claim 5 wherein the digital signals are carried in packets, the monitoring step monitoring the first control messages which are also carried in packets.

13. The method according to claim 4 wherein the monitoring step further comprises the steps of sensing an initial request message for the establishment of a control channel and sensing an acknowledgment message in response to the initial request message, the acknowledgment message indicating whether a communication channel will be allocated in response to the initial request message;

the controlling step controlling whether the echo signals will be minimized on a two-way communication channel based on the type of digitized information determined and based on whether a corresponding acknowledgment message has indicated a communication channel will be allocated.

14. The echo canceler according to claim 8 wherein the digitized signals are carried in packets, and the monitoring means monitors the first control messages which are also carried in packets.

15. The echo canceler according to claim 7 wherein the controller further comprises means for sensing an initial request message for the establishment of a communication channel, and means for sensing an acknowledgment message in response to the initial request message, the acknowledgment message indicating whether a communication channel will be allocated in response to the initial request message;

the controller automatically controlling whether the canceling circuit minimizes echo signals on a two-way communication channel based on the type of digitized information determined and based on whether the corresponding acknowledgment message indicated a communication channel will be allocated.

* * * * *